United States Patent Office 3,513,761
Patented May 26, 1970

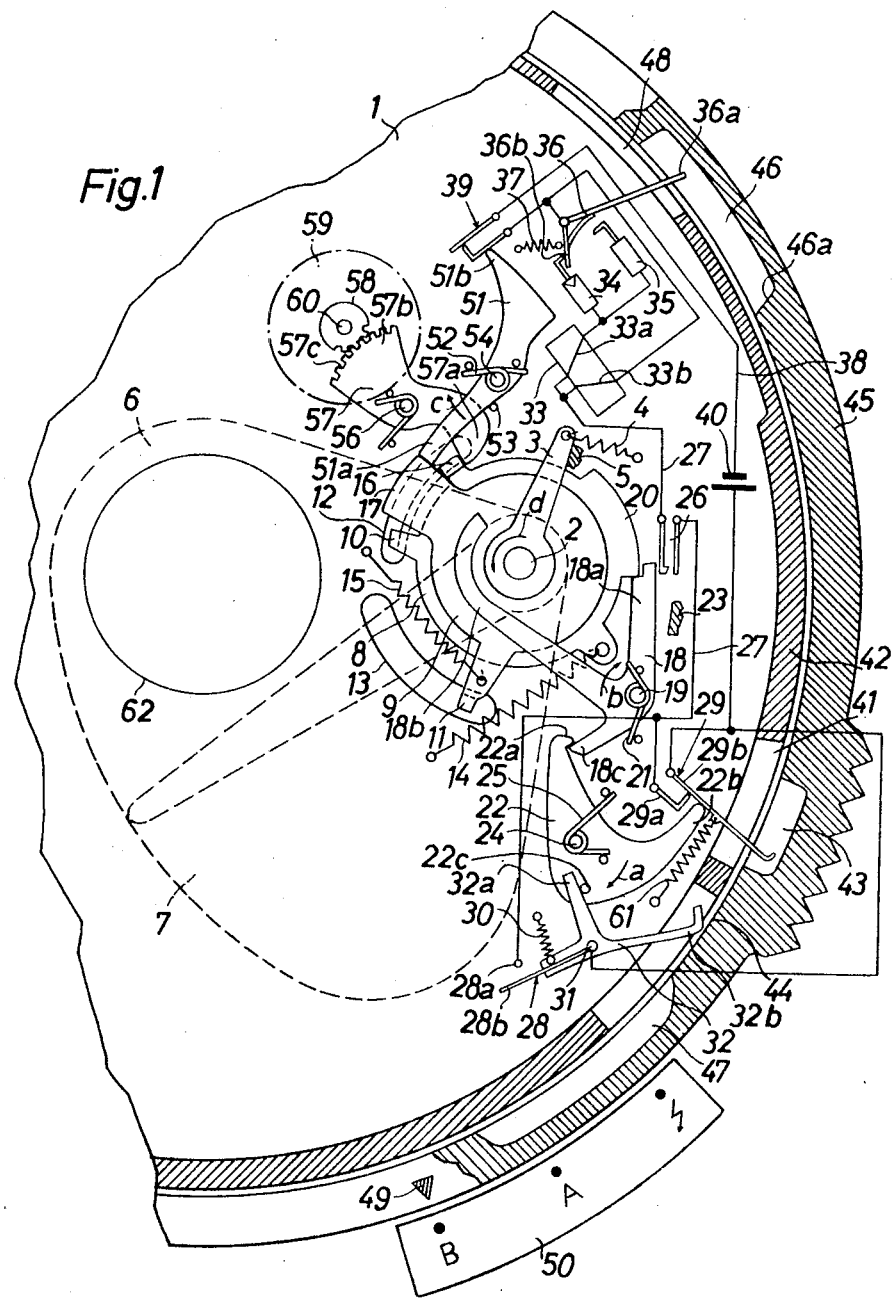

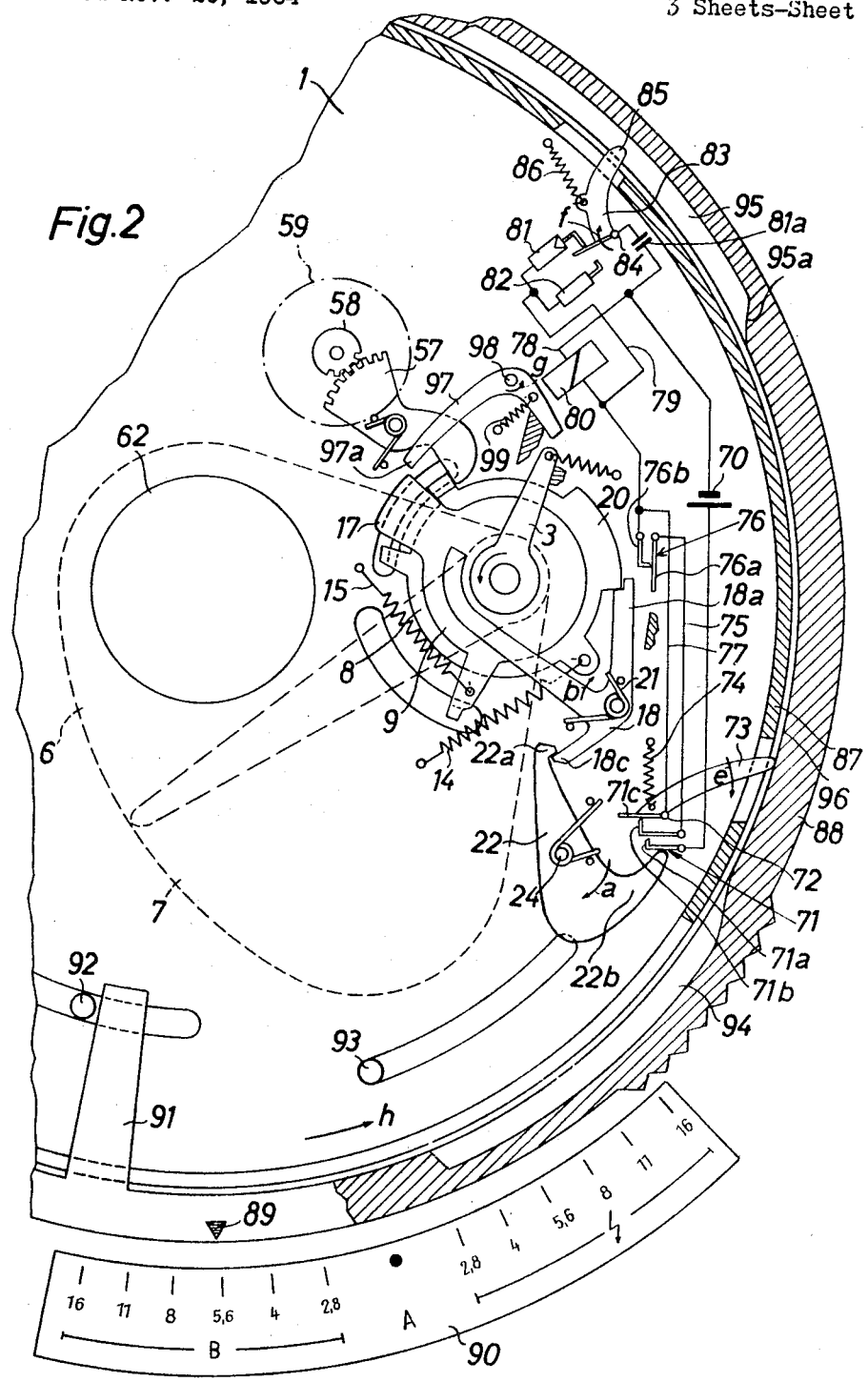

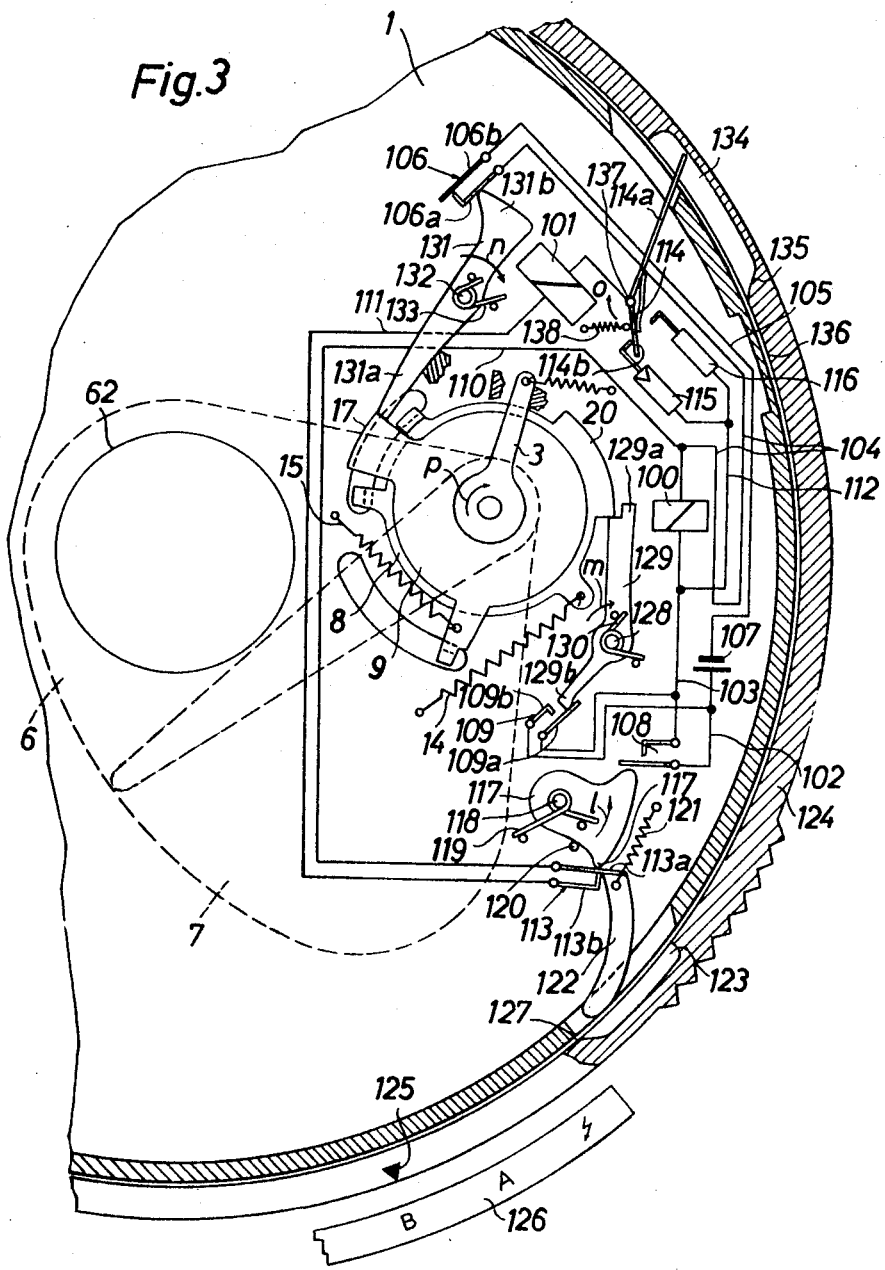

3,513,761
EXPOSURE CONTROLS FOR CAMERAS
Gerd Kiper, Carl-Duisberg-Strasse 33,
Unterhaching, Munich, Germany
Original application Nov. 20, 1964, Ser. No. 412,649.
Divided and this application Nov. 10, 1966, Ser. No. 593,466
Claims priority, application Germany, Nov. 23, 1963,
A 44,630
Int. Cl. G03b 9/64
U.S. Cl. 95—53                                    10 Claims

ABSTRACT OF THE DISCLOSURE

A photographic camera wherein a driving member moves the shutter blades to closed positions in response to energization of a relay which is in circuit with a fixed resistor or with a photosensitive receiver and with two switches which are connected in parallel. One of the switches is closed by the shutter release to complete the circuit of the relay, and the other switch is closed in response to movement of shutter blades to open positions and remains closed irrespective of the position of the one switch until the relay is energized and permits movement of shutter blades to closed positions.

---

This is a division of application Ser. No. 412,649, filed Nov. 20, 1964, now Pat. No. 3,302,544.

The present invention relates to cameras.

More particularly, the present invention relates to exposure controlling structures for cameras.

The present invention can be embodied in cameras wherein the shutter includes leading and trailing members both moveable from a cocked to a rest position with the leading member moving from its cocked to its rest position in advance of the trailing member to make an exposure while the trailing member then moves from its cocked to its rest position to terminate the exposure.

One of the objects of the present invention is to provide for a camera of the above type an electrical exposure controlling structure which enables the camera to be operated so as to make a selected one of a plurality of different types of exposures.

Another object of the invention is to provide a camera wherein the operation of the electrical exposure controlling structure is independent of the length of the interval during which the shutter release is actually engaged by the operator's hand, at least when the camera is set for automatic operation or for operation with flash.

A further object of the invention is to provide a camera wherein the exposure time can be selected as a function of the intensity of scene light independently of the length of intervals during which the operater maintains the shutter release out of ineffective or idle position.

In particular, it is an object of the present invention to provide for a structure of the above type the possibility of making exposures which do not require any automatic controls such as, for example, a time exposure where the camera is placed in a B position.

Furthermore, it is an object of the present invention to provide for a camera of the above type the possibility not only of making a time exposure but also of making either an automatic exposure according to the lighting conditions or a flash exposure.

In particular, the invention has for an object to provide a manually operable selecting means which can be very conveniently operated so as to bring about the above selection of one of a plurality of different types of operation.

Also, it is an object of the invention to provide for a structure of the above type not only structure for controlling the exposure time but also structure for controlling a diaphragm of the camera.

With the above objects in view, one feature of the present invention resides in the provision of an improved shutter assembly, particularly for still cameras. The shutter assembly comprises blade means movable between open and closed positions, driving means operatively connected with the blade means and movable between first and second positions respectively corresponding to open and closed positions of the blade means, closing means operative to initiate, effect or otherwise bring about movement of driving means to second position, relay means having two conditions of energization and arranged to operate the closing means in one of its conditions, a pair of control switches each movable independently of the other to and from an operative position, time delay means for placing the relay means into one condition a predetermined time after movement of either control switch to operative position, release means for placing one of the control switches into operative position, and control means for placing the other switch into operative position, at least for the aforementioned predetermined time, in response to placing of the blade means to open position.

The other control switch will insure that the relay means can remain in the one condition for the predetermined time, irrespective of the position of the one control switch. This is important when the delay means includes a photosensitive element which can select the delay for placing the relay means into one condition as a function of the intensity of scene light. For example, and if the release means comprises a lever which is actuated by hand and if the operator decides to release the lever immediately after such actuation, the one control switch will move to inoperative position prior the elapse of the interval determined by the photosensitive element of the delay means. However, and since the other control switch remains in operative position, such immediate release of the manually actuated lever cannot affect the operation of the delay means.

When in operative positions, the control switches are preferably closed to thereby complete an electric circuit and to connect a current source with the relay means so that, in the one condition thereof, the relay means is energized and operates the closing means in a sense to bring about closing of the blade means.

The novel features which are considered as characteristic for the invention are set forth in particular in the appended claims. The improved shutter assembly itself, however, both as to its construction and its mode of operation, together with additional features and advantages thereof, will be best understood from the following detailed description of certain specific embodiments with reference to the accompanying drawings, in which:

FIG. 1 is a schematic partly sectional illustration of one possible embodiment of a structure according to the invention;

FIG. 2 is a fragmentary schematic partly sectional illustration of a second embodiment of a structure according to the invention; and FIG. 3 is a fragmentary schematic partly sectional illustration of a third embodiment of a structure according to the present invention.

In the embodiment of the invention which is illustrated in FIG. 1 the shutter includes a pair of blades which cooperate to make the exposures. The shutter assembly shown in FIG. 1 includes a supporting plate 1 on which a cocking shaft 2 is supported for rotary movement. The shaft 2 fixedly carries a cocking lever 3 which is acted upon by a spring 4 which seeks to return the cocking lever 3 to a rest position where it engages a stationary stop member 5 which is carried by the plate 1. The cocking shaft 2 extends through openings formed in the pair of shutter blades 6 and 7 as well as through openings formed in a pair of shutter driving discs 8 and 9, all of the elements 6–9 being freely turnable on the cocking shaft 2. The driving discs 8 and 9 are respectively provided with projections 10 and 11 which are fixed to the shutter blades 6 and 7 so that the shutter blade 6 is compelled to turn with the disc 8 while the shutter blade 7 is compelled to turn with the disc 9. The projections 10 and 11 respectively extend through arcuate slots 12 and 13 formed in the plate 1 inasmuch as the blades 6 and 7 are situated on one side of the plate 1 and the shutter driving dics 8 and 9 are situated on the other side of the plate 1. In the event that both the discs and the blades are mounted on the same side of the plate 1, then the discs and blades may be formed of unitary structures where the structure which forms the driving discs is, for example, integral with the blade which it drives. A spring 14 is operatively connected to the shutter driving disc 8 for urging the latter to turn in a clockwise direction, as viewed in FIG. 1, while a spring 15 is operatively connected to the shutter driving disc 9 so as to urge the latter also to turn in a clockwise direction, as viewed in FIG. 1. The shutter driving disc 8 includes, in addition, an angularly extending projection 16 which is situated in the path of turning of the cocking lever 3. The projection 16 forms at the same time a stop for a projection 17 of the driving disc 9. With this arrangement the driving disc 8 forms together with the blade 6 a leading member of the shutter means, this leading member initially moving from its cocked to its rest position in order to initiate the exposure, while the driving disc 9 together with the blade 7 form a trailing member of the shutter means, this trailing member moving from its cocked to its rest position subsequent to the movement of the leading member from its cocked to its rest position so as to terminate the exposure.

In order to release the cocked driving disc 8 so that it can return from its cocked to its rest position, together with the blade 6, a shutter release means in the form of a lever 18 is provided, this lever 18 being supported for turning movement by a pin 19 which is fixedly carried by the plate 1. The shutter release lever 18 has a first arm 18a which, in the cocked position of FIG. 1, engages behind an end of a projection 20 of the disc 8, so that the spring 14 while it is under considerable tension and seeks to turn the disc 8 in a clockwise direction, as viewed in FIG. 1, nevertheless is prevented from doing so as long as the arm 18a remains in the position shown in FIG. 1. The lever 18 has a second arm 18b which extends into the range of turning of the cocking lever 3, so that during cocking of the structure by the lever 3 the latter will engage and turn the release lever 18. The lever 18 has a third arm 18c which in the cocked position of the assembly extends behind a hooked end portion 22a of a manually operable release lever 22 forming a manually operable shutter release means together with the lever 18. The extent of turning of the lever 18 limited by a stationary stop member 23 which is carried by the plate 1, and a spring 21 is coiled about the pin 19 and engages a stationary pin as well as a pin carried by the lever 18 so as to urge the latter to turn in the direction of the arrow b. However, in the cocked position of the structure the engagement of the arm 18c by the end 22a of the lever 22 prevents the spring 21 from turning the lever 18 into engagement with the stop member 23. The shutter release lever 22 is fixedly carried by a shaft 24 which is supported for turning movement by the plate 1. In a manner well known in the art a structure which is accessible to the operator is connected with the shaft 24 so as to enable the latter to be turned by the operator. A spring 25 is coiled about the pin 24 and engages a stationary pin as well as a pin carried by the lever 22 so as to urge the latter to turn in the direction of the arrow a shown in FIG. 1.

With this particular embodiment of the invention, the exposure controlling structure includes a normally open control switch 26 which is situated in the path of the turning of the arm 18a toward the stop member 23 so that when the shutter is released the arm 18a will engage and close the switch 26 which forms part of an electrical means of the invention, this electrical means cooperating with a blocking means as described below. The electrical means includes in addition to the normally open control switch 26, a branch 27 of an electrical circuit, the switch 26 being situated in this branch. The branch 27 is on the one hand connected with a pair of contacts 28a and 29a, the latter being connected in parallel with each other, these contacts forming stationary contacts of a pair of switches 28 and 29 which form a pair of additional control switches. The additional switch 28 includes also a movable contact 28b which is urged by a spring 30 to turn into engagement with the stationary contact 28a. This movable contact 28b is carried by a lever 32 which is supported for turning movement about a stationary pin 31 which is carried by the plate 1. This lever 32 is provided with an arm 32a which is urged by the spring 30 into engagement with a pin 22c which is carried by the shutter release lever 22. The other end of the branch 27 of the electrical circuit is connected with a pair of oppositely wound coils 33a and 33b of a relay 33. The coil 33a of the relay 33 is electrically connected with a photosensitive resistor 34 which in a well known manner changes its resistance with changes in the intensity of light impinging on the resistor 34, and a fixed resistor 35 is connected to the coil 33a in parallel with the photosensitive resistor 34. The electrical means further includes a switch 36 which is capable of being placed either in electrical connection with the resistor 35 or in electrical connection with the resistor 34, and a spring 37 is connected with the switch 36 to urge the latter into engagement with the photosensitive resistor 34. The lever or switch 36 is supported for rotary movement by the plate 1 and has an arm 36a for a purpose described below. This switch 36 is electrically connected with the coil 33b with which it is connected in parallel to another branch 38 of the electrical circuit, this branch 38 including, in series, the interruptor switch 39 and the source of current 40. Thus, one pole of the current source 40 is connected through the branch 38 with the movable contact 29b of an additional control switch 29, a spring 61 urging the movable contact 29b into its closed position engaging the fixed contact 29a which is connected in the branch 27 of the circuit in the manner described above.

This movable contact 29b extends through an opening 41 formed in the outer wall of the shutter housing 42, and the movable contact 29b extends into a recess 43 formed in the interior of a manually turnable ring 45 which has an inner surface 44 next to the recess 43 and capable of engaging the movable contact 29b depending upon the position in which the operator places the ring 45. The manually turnable ring 45 forms a manually operable selecting means which enables the operator to select one of three different types of operation, as described in greater detail below. The ring 45 is formed at its inner surface with a pair of additional recesses 46 and 47. The recess 46 receives the elongated arm 36a of the switch 36, this arm extending through an opening 48 formed in the outer tubular wall 42 of the housing. The recess 47 as well as the inner surface 44 adjoining this recess cooperate with the arm 32b of the contact lever 32. The ring 45 carries an index 49 which cooperates with the stationary scale 50 having three markings indicating a B position, an automatic position, and a flash position. In the B position the operator can make time exposures since the shutter will remain open as long as the operator manually maintains the shutter in its open position. In the automatic position the structure will automatically determine the exposure time according to the lighting conditions, and in the flash position a fixed exposure time will automatically be provided, this fixed exposure time being suitable for flash exposures.

The electrical means described above is capable of being placed in a select one of these three positions by the manually operable selecting means 45, and the structure includes in addition a blocking means 51 movable between the blocking position illustrated in FIG. 1 and a release position, this blocking means 51 when in its blocking position blocking return of the shutter member formed by disc 9 and blade 7 to its rest position from its cocked position, this latter shutter members of course being the trailing member of the shutter means.

The blocking means 51 is in the form of a lever which is acted upon by a spring 52 so as to be urged in a direction which displaces it to the blocking position shown in FIG. 1, and the extent to which the lever 51 is turned by the spring 52 is limited by a stationary stop member 53 engaged by the lever 51 and carried by the plate 1, so that in this way the blocking position of the lever 51 is determined. The lever 51 is supported for rotary movement by a pin 54 carried by the plate 1, and the spring 52 is coiled about the pin 54 and engages a stationary pin carried by the plate 1 as well as a pin carried by the lever 51. In its blocking position the arm 51a of the lever 51 extends into the path of turning of the projection 17 of the disc 9. Therefore, it prevents the spring 15 from returning the disc 9 to its rest position. In its blocking position shown in FIG. 1 the lever 51 has an arm 51b engaging the switch 39 and maintaining the latter closed.

A retarding mechanism cooperates with the driving disc 8 for mechanically retarding the initial movement of the disc 8 from its cocked position back toward its rest position. This retarding mechanism includes a retarding lever 57 supported for rotary movement by a pin 56 which is carried by the plate 1. The lever 57 has an arm 57a which, in the cocked position of the shutter, is situated in the path of turning of the projection 16 of the disc 8. Also, the lever 57 has an arm 57b provided with gear teeth 57c which mesh with a pinion 58. The pinion 58 is fixed with a rotary mass 59 which is supported together with the pinion 58 for rotary movement about a pin 60 fixedly carried by the plate 1. Of course, instead of relying upon the inertia of the mass 59 to provide the retarding action, it is possible to use other known retarding mechanisms, such as, for example, an escapement and anchor mechanism.

In the position of the parts shown in FIG. 1, the manually operable selecting means 45 has been placed into a position in which the index 49 is aligned with the graduation B of the scale 50, so that the operator has chosen to place the electrical means in the B position in order to make a time exposure. With the parts in this position the operator can turn the lever 22 in a direction opposite to that indicated by the arrow a, the shaft 24 being turnable by the operator through the intermediary of an unillustrated structure as described above. The result of the turning of the shutter release lever 22 is that the arm 22b engages and moves the movable contact 29b away from the stationary contact 29a of the control siwtch 29. Immediately thereafter the hooked end portion 22a of the lever 22 releases the arm 18c of the lever 18. The spring 21 now turns the lever 18 in the direction of the arrow b. As a result the switch 26 closes. Inasmuch as the additional control switch 28 is maintained open because the arm 32a of the lever 32 which carries the contact 28b is an engagement with the surface 44, it is possible for current to flow through the circuit even though the control switch 26 has been closed. When the lever 22 turns in the direction opposite to that indicated by the arrow a the spring urges the arm 32a to follow the pin 22c, but the extent of turning at this time is limited by engagement of the outer arm of the lever 32 which extends through the opening in the tubular wall 42 of the shutter housing, this outer arm 32a being capable only at this time of engaging the surface 44 so that the lever 32 does not follow the movement of the pin 22c at this time.

Moreover, the turning of the release lever 18 has caused its arm 18a to release the driving disc 8 which is now urged by the spring 14 toward its rest position together with the shutter blade 6. However, the initial movement of the leading shutter member 6, 8 toward its rest position is retarded by the retarding means 57–59. This retarding serves to compensate for a delay in the response of the relay 33. The path that the projection 16 of disc 8 must move through in order to displace the lever 57 through a distance sufficient to release the disc 8 for unrestrained movement by the spring 14 to its rest position is made great enough so that until the disc 8 is released to the unrestrained force of the spring 14 the opening 62 remains covered by the blade 6. In other words there can be no exposure through the opening 62 as long as the retarding means retards the movement of the disc 8.

After the lever 57 has been turned through a distance sufficient to release the projection 16 of the lever 8 so that the retarding mechanism no longer retards the disc 8, this disc 8 can completely run down to its rest position very suddenly under the action of the spring 14, and of course the opening 62 will be uncovered so that the exposure will commence.

The shutter will now remain open as long as the operator holds the lever 22 in the position where it maintains the switch 29 open in the manner described above. At the moment when the operator releases the lever 22, however, this lever 22 can return to its initial position under the action of the spring 25, the lever 22 turning at this time in the direction of the arrow a. At the end of the return of the lever 22 to its rest position the switch 29 will close. Inasmuch as the switch 26 is also closed at this time, the circuit will be closed through the branches 27 and 38. As a result the relay responds, and the energizing of the relay will depend upon the resistance value of the photosensitive resistor 34, the extent to which the response of the relay 33 is delayed being determined by the intensity of the light which reaches the photosensitive resistor 34. Inasmuch as the greatest possible extent of delay in response of the relay 33 due to the resistor 34 is so extremely small in relation to the large delay which has been manually provided by manual holding of the lever 22 in the position which maintains the switch 29 open, the very slight additional delay provided in the response of the relay 33 due to the resistor 34 is of absolutely no practical consequence.

At the moment when the relay 33 becomes energized it will turn the lever 51 in the direction of the arrow c, the arm 51b acting as an armature which is attracted to the relay 33 when the latter is energized. Therefore, the electrical means in this way displaces the blocking means 51 from its blocking to its release position, and in the release position the arm 51a of the blocking lever 51 is no longer in the path of movement of the projection 17 so that the spring 15 can now turn the disc 9 together with the blade 7 from their cocked position shown in FIG. 1 to their rest position, with the result that the opening 62 is again closed. At the same time, the arm 51b has moved away from the switch 39 which now automatically opens under the influence of the springy movable contact which moves by its own inherent resiliency away from the stationary contact as soon as the springy movable contact is no longer engaged by the arm 51b. The opening of the switch 39 by displacement of the blocking means to its release position results in interruption of the current flow through the circuit which of course is opened upon opening of the interrupter switch 39.

In this way an exposure takes place with the structure of FIG. 1 when the operator selects the B position according to which it is possible for the operator to make a time exposure. When the operator next cocks the shutter, the operator will through an unillustrated well known structure manually turn the shaft 2 together with the lever 3 in the direction of the arrow *d* in opposition to the spring 4, so that the lever 3 moves away from the stop 5. The lever 3 will now engage the projection 16 to displace the latter together with the disc 8 and the blade 6 in the direction of the arrow *d*, and since in the rest position the projection 17 engages the projection 16, the disc 9 also turns together with the blade 7, so that during cocking of the shutter there is no relative movement between the blades 6 and 7 and the opening 62 remains covered. The operator continues to turn the cocking lever 3 until the lever 3 by engagement with the arm 18*b* has turned the lever 18 in a direction opposite to that indicated by the arrow *b* through an angle sufficient to cause the arm 18*c* to engage behind the hooked end 22*a* of the lever 22, and at this time the arm 18*a* will have also engaged behind the projection 20, so that the operator can now release the lever 3 for return movement to its rest position, and the parts will now again be in the position of FIG. 1 ready for the next exposure.

Assuming now that with the parts in the position shown in FIG. 1 the operator decides to make an exposure with flash illumination, then the operator will simply turn the manually operable selecting means 45 until its index 49 is aligned with the flash symbol of the scale 50, so that in this way the electrical means is placed in the flash position. The result of this turning of the ring 45 is that the end 46*a* of the recess 46 engages the arm 36*a* of the switch 36 and turns the latter until its contact arm 36*b* engages the fixed resistor 35, so that now the fixed resistor 35 is connected into the branch 38 of the circuit and the photosensitive resistor 34 is no longer connected into the circuit. On the other hand, the openings 43 and 47 also have been angularly displaced. As a result the opening 47 is now aligned with the outwardly directed arm of the lever 32 and is in a position for receiving this arm, while at the same time the control surface 44 at the interior of the ring 45 has engaged and moved the contact arm 29*b* of the switch 29 so that this latter switch is now open and remains open as long as the ring 45 remains in the flash position.

Now when the operator turns the release lever 22 in a direction opposite to that indicated by the arrow *a*, the lever 22 will of course release the lever 18 while on the other hand the spring 30 will be capable of continuing to turn the lever 32 beyond the position thereof shown in FIG. 1 with the outer arm of the lever 32 extending into the recess 47, so that the result is that at this time the switch 28 will close, and of course the switch 29 is maintained open as pointed out above. The movement of the lever 18 by the spring 21 in the direction of the arrow *b* has of course released the projection 20 and in addition the switch 26 has become closed. The disc 8 is thus released for return to its rest position, although its initial movement is delayed by the retarding means as pointed out above. As a result of the simultaneous closing of the switches 26 and 28 current can flow through the circuits 27 and 38, and the result is that the relay 33 is energized. Of course, during the cocking of the shutter the spring 52 has returned the lever 51 to its blocking position as soon as the projection 17 moved beyond the free end of the arm 51*a*. The energizing of the relay 33 is delayed, however, inasmuch as the fixed resistor 35 is located in the circuit of the coil 33*a*, the building up of the field of the relay 33 being delayed for a predetermined time as a result of the magnitude of the resistor 35. This magnitude of the resistor 35 is so chosen that the delay period in the response of the relay 33 will provide an exposure time suitable for a flash exposure, this exposure time being on the order of 1/30 sec., for example. As soon as the relay 33 responds the blocking means 51 will of course be displaced to its release position so as to release the disc 9 in the manner described above, and thus the exposure can be terminated and the interruptor switch 39 will automatically open so that the flow of current through the circuit is interrupted.

If the operator has chosen to make an automatic exposure, then of course the index 49 has been placed in alignment with the symbol A of the scale 50, and at this time the operations which take place are precisely the same as those described above in connection with flash illumination, except that the movement of the index 49 into alignment with the symbol A does not displace the end 46*a* of the recess 46 through a distance sufficient to turn the switch 36 away from its position shown in FIG. 1, so that at this time the photosensitive resistor 34 is in the circuit and thus the extent to which the response of the relay 33 is delayed will be determined by the photosensitive resistor 34 in accordance with the lighting conditions, and therefore the exposure time will be determined by the lighting conditions. Except for this difference of having the photosensitive resistor 34 in the circuit instead of the fixed resistor 35, all of the above-described operations which take place during flash illumination take place during illumination with automatic determination of the exposure time.

In the embodiment of the invention which is illustrated in FIG. 2, there is also a shutter means having leading and trailing members and constructed precisely as described above, with respect to its mechanical structure, as distinguished from its electrical structure, so that the description of the mechanical structure of FIG. 2 which is identical with that of FIG. 1 is not repeated, and the same reference characters are used for the identical elements.

The electrical means of FIG. 2 includes a source of current 70 to which a movable contact 71*a* of a switch 71 is electrically connected, this switch 71 having an intermediate stationary contact 71*b* with which the movable contact 71*a* cooperates as well as an additional movable contact 71*c* on the other side of the stationary contact 71*b* from the movable contact 71*a*. The control switch 71 of FIG. 2 takes over the functions which correspond to those performed by the switches 28 and 29 of FIG. 1. The movable contact 71*c* of this switch is carried by a lever 73 which is turnable about a pin 72 carried by the plate 1. A spring 74 is operatively connected to the control lever 73 to urge the latter to turn in the direction of the arrow *e*. In the illustrated position the lever 73 has its free end in engagement with the inner surface of the manually operable selecting means of this embodiment. The contact 71*b*, which is stationary, is connected by a conductor 75 with a movable contact 76*a* of a control switch 76. The contact 71*c* is electrically connected through a conductor 77 with the contact 76*b* of the control switch 76, this contact 76*b* being stationary so that the movable contact 76*a* can move into and out of engagement with the contact 76*b*. Between the contact 76*b* and the source of current 70 are a pair of parallel circuit branches 78 and 79 which respectively are connected with the relay 80 and the pair of parallel connected resistors one of which is the photosensitive resistor 81 and the other of which is the fixed resistor 82. Thus, this branch 79 of the circuit is provided with the switch 83 which can alternately be connected electrically with one of the resistors 81 or 82. This switch 83 is supported for turning movement by a pin 84 carried by the plate 1, and the switch 83 has an arm 85 which is capable of determining the position of the switch 83. A spring 86 is connected to the switch 83 to urge the latter to turn in the direction of the arrow *f* where the switch is connected to the photosensiive resistor 81. A capacitor 81*a* is connected into the circuit of the switch 83 so as to become charged to an extent determined by the magnitude of the resistors 81 or 82, and then during subsequent discharge of the capacitor 81*a* the relay 80 will be maintained energized for a time period determined by the extent to which the capacitor is charged.

The manually turnable ring 88 which forms the manually operable selecting means of FIG. 2 concentrically surrounds the outer tubular wall 87 of the shutter housing and carries the index 89 which cooperates with the stationary scale 90. The scale 90 has a pair of adjusting ranges for flash exposure and for time exposures in the B position, and each of these ranges is provided with a series of graduations indicating aperture settings of an unillustrated diaphragm of the assembly. Between these diaphragm-setting ranges for the B position and the flash position is situated the automatic position. Moreover, the ring 88 has an inwardly directed projection 91 which when the ring 88 is set for time or flash exposures will alternately cooperate with the pins 92 and 93 which respectively project from a pair of diaphragm adjusting rings either of which when turned relative to the other will adjust the exposure aperture provided by the diaphragm.

The ring 88 is provided at its inner surface with a pair of recesses 94 and 95 between which the ring has its inner control surface 96. The recess 94 cooperates with the lever 73 while the recess 95 cooperates with the arm 85 of the switch 83.

A suming now that the operator has placed the index 89 at the B range so as to set the electrical means in the B position for providing a time exposure, then when the operator turns the shaft 24 and the release lever 22 in the direction opposite to that indicated by the arrow $a$, the arm 22b will engage the movable contact 71a and place it in engagement with the stationary contact 71b, so that now the current can flow through the closed circuit. The result is that the relay 80 becomes energized and turns the blocking lever 97, which forms the blocking means of FIG. 2 and is turnable on a fixed pin 98, in opposition to the spring 99 in the direction of the arrow $g$, so that the arm 97a of the lever 97 will now be situated in the path of turning of the projection 17 of the driving disc 9. Therefore, the driving disc 9 is blocked against running down movement with the blade 7. It is to be noted that with the embodiment of FIG. 2 the relay 80 when energized displaces the blocking means from its released to its blocking position while it is the deenergizing of the relay 80 which releases the blocking means 97 for movement by the spring 99 from its blocking to its release position.

During the further turning of the release lever 22, its hooked end 22a releases the arm 18c of the release lever 18, so that now the spring 21 can turn the lever 18 in the direction of the arrow $b$. As a result the arm 18a will leave the projection 20 of the driving disc 8 so that the latter can now run down under the action of the spring 14, this running down however being initially retarded, as was the case with the embodiment of FIG. 1, by the retarding means 57–59. After overcoming the retarding means the blade 6 will be displaced to a position uncovering the opening 62 so as to commence the exposure. The turning of the lever 18 in the direction of the arrow $b$ has also caused the arm 18a to engage the movable contact 76a of switch 76 and displace it away from stationary contact 76b, so that the switch 76 is now open. However, at this time the circuit is not broken inas much as the switch 76 is bridged by the conductor 77 and the contacts 71b, 71c. Therefore, the relay 80 remains energized and holds the blocking means 97 in its blocking position.

Only at the moment when the operator releases the lever 22 does the arm 22b thereof move away from the contact 71a which under its own resiliency will displace itself away from the stationary contact 71b, so that now the circuit will be interrupted. Now the relay 80, after a relatively small but insignificant delay, from the standpoint of the time exposure, resulting from the value of the resistance of the photo sensitive resistor 81, will become deenergized, so that the blocking means 97 is released to the spring 99 which displaces the blocking means to its release position shown in FIG. 2, and in this release position the arm 97a of course is situated beyond the projection 17 so that the spring 15 can now turn the trailing member 7, 9 of the shutter to its rest position, and thus the opening 62 will be closed and the exposure will be terminated.

In order to make an exposure with flash illumination, the manually operable selecting means 88 is turned by the operator until the index 89 thereof is aligned with a selected aperture graduation of the flash range of the scale 90. As a result the arm 91 of the ring 88 turns in the direction of the arrow $h$. The pin 92 will initially follow the arm 91, this pin 92 being fixed to a diaphragm adjusting ring which is urged by an unillustrated spring in a counterclockwise direction, as viewed in FIG. 2, so that the pin 92 will follow the arm 91. However, the continued turning of the ring 88 will displace the projection 91 away from the pin 92 and into engagement with the projection 93 which is connected to the other diaphragm adjusting ring, so that now the continued movement of the pin 93 with the arm 91 will result in adjusting of the aperture to a selected value of the flash range of the scale 90. During this turning of the ring 88 the recess 94 thereof has become situated in alignment with the control lever 73. Therefore, this lever 73 can be turned by the spring 74 in the direction of the arrow $e$. As a result the engagement between the movable contact 71c and the stationary contact 71b of the switch 71 is interrupted, and this part of the switch is therefore opened. The turning of the ring 88 also results in displacement of the inclined surface 95a at the end of the recess 95 into engagement with the arm 85 so that the free end of the latter will engage the inner surface 96 of the ring 88, and the result is that the arm 83 will be turned in opposition to the spring 86 in a direction opposite to that indicated by the arrow $f$. When the end of the arm 85 engages the control surface 96 the switch 83 has been placed in electrical connection with the fixed resistor 82 and is no longer in electrical connection with the photosensitive resistor 81 of the branch 79 of the circuit.

Now when the operator actuates the release shaft 24 so as to turn the release lever 22 in a direction opposite to that indicated by the arrow $a$, the arm 22b will place the movable contact 71a into engagement with the stationary contact 71b so as to close this part of the circuit 71. As a result the current flows through the conductor 75. This results in energizing of the relay 80 which acts on the armature portion of the lever 97 so as to turn the latter to the blocking position where the arm 97a is situated in the path of turning of the projection 17 of the disc 9.

During a further turning of the lever 22 its hooked portion 22a releases the arm 18c so that the spring 21 can now turn the lever 18 in the direction of the arrow $b$. Thus, the arm 18a will move away from the projection 20 so as to release the disc 8 which now can run down after being initially retarded by the means 57–59, and thus the opening 6 will be uncovered and the exposure will commence.

The turning of the lever 18 in addition causes its arm 18a to open the switch 76. Thus, the flow of current in the circuit is interrupted. Inasmuch as, however, the resistor 82 acts as a shunt resistor, the de-energizing of the relay 80 will be delayed because the balancing current of the shunt circuit returns to its own coil. Also, the de-energizing of the relay 80 will be determined in accordance with the extent to which the capacitor 81a was charged, as pointed out above. The extent of the delay depends upon the magnitude of the resistance of the fixed resistor 82, and this magnitude is so chosen that an exposure time will be provided which is also suitable for making an exposure when using flash illumination with a flash bulb device. Upon de-energizing of the relay 80 the blocking means 97 will be displaced by the spring 99 to its release position, in which it is shown in FIG. 2, and thus the projection 17 will be released. As a result the trailing member 7, 9 of the shutter means can now follow the leading member under the action of the spring 15 so that the shutter blade 7 closes the opening 62 and the exposure is terminated.

During the exposure with the index 89 of FIG. 89 of FIG. 2 in the automatic position, all of the parts will operate in the same way as when the index 89 is in the flash position. However, in this case it is the photosensitive resistor 81 which will be connected into the circuit instead of its resistor 82, and the extent of the exposure time will therefore be determined by the value of the photosensitive resistor 81, the value of this latter resistance of course being automatically determined by the light intensity. Of course, when the index 89 is in the automatic position the arm 85 of the switch 83 remains in the recess 85 while the lever 73 of course is displaced into the recess 94.

With the embodiment of FIG. 3 there is also a mechanical shutter assembly similar to that of FIG. 1. However, the difference between the embodiment of FIG. 3 and that of FIGS. 1 and 2 resides primarily in the fact that a relay 100 is relied upon to release the leading shutter member 6, 8 while a relay 101 is relied upon to release the trailing shutter member 7, 9. The relay 100 is connected through the circuit branches 102, 103, 104 and 105 in series with the interruptor switch 106 as well as with the source of current 107 and a control switch 108. Between the branches 102 and 103 there is connected an additional control switch 109 which is in parallel with the control switch 108. Furthermore, the circuit branches 110, 111 and 112 connect a further control switch 113 in parallel with the relay 100. This switch 113 is located in the circuit which is in parallel with the relay 100 in series with the relay 101 and the switch 114 which serves to alternately connect into the circuit either the photosensitive resistor 115 or the fixed resistor 116, these latter resistors being connected into that part of the circuit which includes the branches 110–112.

A release lever 117 forms the shutter release means of this embodiment and is fixedly carried by a rotary shaft 118 which can be manually turned by the operator through an unillustrated structure. The turning of the release lever 117 by the operator enables this release lever to engage and close the switch 108. The release lever 117 is acted upon by a spring 119 which seeks to turn the lever 117 in a direction opposite to that indicated by the arrow $l$, until the lever 117 engages the stationary stop member 120 which is carried by the support plate 1. In this rest position of the lever 117 the switch 108 is open, this switch being a normally open switch having a springy movable contact which by its own resiliency assumes an inoperative position spaced from the stationary contact of the switch. The release lever 117 can also cooperate with the movable contact 113a of the additional control switch 113. A spring 121 is operatively connected to the movable contact 113a, and this spring 121 seeks to maintain the movable contact 113a in engagement with the release lever 117. In the position of the parts shown in FIG. 3, where the parts are in their rest position, the lever 117 holds the switch 113 in its closed position. When the lever 117 turns in the direction of the arrow $l$, the contact 113a can move away from the stationary contact 113b of the switch 113 so as to open the switch 113. During such movement the arm 122 which is connected to the movable contact 113a will move with respect to the recess 123 which is formed at the interior of the manually operable selecting ring 124.

The ring 124 carries an index 125 which cooperates with a stationary scale 126. The scale 126 has the symbols for the three positions of the electrical means of FIG. 3, namely the B position, for time exposures, the automatic position for exposures automatically determined in accordance with the lighting conditions, and for flash exposures. When the ring 124 is turned to a position different from that shown in FIG. 3, the surface 127 at the interior of the ring 124 and located next to the recess 123 thereof engages the free end of the arm 122 and prevents movement of the contact 113a by the spring 121 so that independently of the turning of the release lever 117 by the operator the switch 113 remains closed. In order to release the driving disc 8 of the shutter a control lever 129 is supported for turning movement on a fixed pin 128 carried by the plate 1. The lever 129 has a portion which acts as an armature for the relay 100, and a spring 130 urges the lever 129 to the illustrated position where its end 129a cooperates with the projection 20 to maintain the shutter in its cocked position. The energizing of the relay 100 will displace the lever 129 in opposition to the spring 130 in the direction of the arrow $m$. As a result its portion 129a will release the projection 20 so that the leading shutter member 6, 8 will be released. At the same time the arm 129b of the lever 129 releases a movable contact 109a of the normally closed switch 109 for movement into engagement with the stationary contact 190b thereof, and thus the displacement of the lever 129 by the relay 100 will also result in placing of the control switch 109 into an operative position.

The embodiment of FIG. 3 includes a blocking or closing means 131 which in its rest position is in a blocking position blocking running down of the trailing member 7, 9 of the shutter 7 means, and this blocking means takes the form of a lever supported for turning movement about a pin 132 which is carried by the plate 1. The lever 131 is urged by a spring 133 to the illustrated blocking position. When the relay 101 becomes energized the lever 131 is turned by attraction of its armature portion 131b to the relay 101 in the direction of the arrow $n$, in opposition to the spring 133. This movement displaces the blocking arm 131a away from the path of movement of the projection 17 of the driving disc 9 so that the latter is free to be turned by the closing spring 15 together with the shutter blade 7 to the closed position. At the same time the movement of the arm 131b toward the coil of the relay 101 opens the switch 106 by releasing the movable contact 106a thereof for movement due to its own inherent resiliency away from the stationary contact 106b of the switch. In this way the interruptor switch 106 opens when the blocking means is displaced by the relay 101 to its release position.

The ring 124 is provided not only with the recess 123 but also with a second recess 134 which at one end is defined by an inclined surface 135 which leads from the interior of the recess 134 to the inner control surface 136 of the ring 124 which forms the manually operable selecting means of FIG. 3. The recess 134 and the inclined surface 135 together with the surface 136 cooperate with the arm 114a of the switch 114. The switch is supported for rotary movement about a stationary pin 137 and is acted upon by a spring 138 so as to be urged into engagement with the photosensitive resistor 115, the spring 138 urging the switch 114 to turn in the direction of the arrow $o$. The elongated contact arm 114b is electrically connected with the circuit branch 111. Thus, through the contact 114b it is possible to connect into the circuit either the photosensitive resistor 115 or the fixed resistor 116.

In order to make a time exposure the index 125 is placed in the illustrated B position, and the shaft 118 is manually turned through the unillustrated structure accessible to the operator, so as to turn the lever 117 therewith in the direction of the arrow $l$. As a result the switch 113 opens during the initial movement of the lever 117. Immediately thereafter the lever 117 closes the control switch 108. The closing of the control switch 108 enables current to flow through the circuit branches 102, 103, 104, 105, with the result that the relay 100 becomes energized. Therefore, the lever 129 is turned in the direction of the arrow $m$. Its arm 129a releases the projection 20 of the driving disc 8, so that the leading shutter member 6, 8 can now turn under the influence of the spring 14 in the direction of the arrow $p$. In this way the blade 6 moves to its rest position and uncovers the opening 62 so as to initiate the exposure. At the same time the turning of the arm 129b of the lever permits the switch 109 to close.

After the period of time chosen by the operator has elapsed, the operator will release the lever 117 so that it can be returned by the spring 119 to the rest position shown in FIG. 3, and thus the switch 108 opens while the switch 113 is closed. Therefore, the current can now flow from the source 107 through the additional control switch 109, the branches 103, 112, the photosensitive resistor 115, the switch 114, the relay 101, the branch 111, the additional control switch 113, the branch 110, the branch 104, the interruptor switch 106 and the branch 105 as well as the relay 100. The relay 101 therefore becomes energized and turns the blocking means 131 in the direction of the arrow n. Therefore, the arm 131a releases the projection 17 so that the trailing shutter member 7, 9 can be turned by the spring 15 to its rest position of the arrow p, and thus the blade 7 closes the opening 62 and the exposure is terminated. The turning of the lever 131 also results in opening the interruptor switch 106, so that the relays 100 and 101 become unenergized.

During the cocking of the shutter the discs 8 and 9 together with the blades 6 and 7 turn in a direction opposite to that indicated by the arrow p, as a result of the turning of the cocking lever 3 in the manner described above. At the end of the cocking movement the lever 129 can engage with its arm 129a behind the projection 20 and the blocking means 131 will return with its arm 131a in the path of movement of the projection 17.

In order to make an exposure with flash illumination, the operator turns the manually operable selecting ring 124 until its index 125 is aligned with the flash symbol of the scale 126. As a result the surface 127 engages the free end of the arm 122 and thus locks the switch 113 in its closed position. At the same time the inclined surface 135 and then the surface 136 engage the arm 114a of the switch 114 so as to turn the latter counter to the direction of the arrow o, thus placing the contact 114b in engagement with the fixed resistor 116 which is now located in the circuit instead of the photosensitive resistor 115.

Now when the operator turns the lever 117 in the direction of the arrow l, the switch 108 closes. Of course, the switch 113 remains closed. The current can now flow from the source 107 through the branch 102, the switch 108, the relay 100, the branch 104, the interruptor switch 106 and the branch 105, so that the relay 100 is energized. As a result the release lever 129 turns in the direction of the arrow m and its arm 129a moves way from the projection 20 so that the leading shutter member 6, 8 is released for movement to its rest position by the spring 14. At the same time the current can flow from the source 107 through the control switch 108, the branch 112, the fixed resistor 116, the switch 114, the relay 101, the branch 111, the additional control switch 113, the branch 110, 104, the interruptor switch 106 and the branch 105. As a result of the flow of current through the resistor 116 the relay 101 becomes energized after a predetermined time interval. The size of the resistor 116 is chosen so that an exposure time suitable for flash illumination will be provided, this exposure time being, for example, 1/30 sec. The responding of the relay 101 results in movement of the blocking means 131 to its release position in the direction of the arrow n, so that the arm 131a moves away from the projection 17 permitting the trailing member 7, 9 of the shutter means to turn in the direction of the arrow p under the influence of the spring 15, so that now the opening 62 is closed by the blade 7 and the exposure is terminated. At the same time the turning of the lever 131 in the direction of the arrow n opens the switch 106 so that the flow of current in the control circuit is terminated.

In the event that the operator very quickly releases the lever 117 for return to its rest position, it is possible that this release will take place before termination of the exposure, and for this purpose the closed switch 109 will maintain the circuit closed even if the switch 108 should open, so that a proper exposure will be achieved even under these conditions.

The operation of the structure with the index in the automatic position where the index 125 is aligned with the intermediate symbol of the scale 126 provides substantially the same operation as when the operator chooses a flash exposure. The only difference is that in this case instead of the resistor 116 being in the circuit, the photosensitive resistor 115 is connected into the circuit, so that the moment when the relay 101 responds will be determined by the light intensity.

The invention is of course not limited to the particular details described above. For example the invention is equally useful with other types of shutters having leading and trailing shutter members where the leading member moves from its cocked to its rest position in advance of the trailing member to initiate the exposure while the trailing member then moves from cocked to its rest position to terminate the exposure. Such a shutter can include, for example, a plurality of shutter blades controlled by a pair of rings one of which is a leading ring which turns with respect to the trailing ring after both rings have been placed in their cocked position so as to open the shutter while the trailing ring then turns from its cocked to its rest position to close the shutter. Also, the invention can be used with a focal plane shutter. Moreover, the structure of the invention can be used with that type of automatic shutter which is immediately released to make an exposure as soon as the cocking thereof is completed.

It will be understood that each of the elements described above, or two or more together may also find a useful application in other types of cameras differing from the types described above.

While the invention has been illustrated and described as embodied in shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of my contribution to the art.

What is claimed as new and desired to be secured by Letters Patent is:

1. In a camera, a shutter assembly comprising blade means movable between open and closed positions; driving means operatively connected with said blade means and movable between first and second positions respectively corresponding to open and closed positions of said blade means; closing means operative to bring about movement of said driving means to second position; relay means having two conditions of energization and arranged to operate said closing means in one of said conditions; a pair of control switches connected in parallel with each other and each movable independently of the other to and from an operative position; time delay means for placing said relay means into said one condition a predetermined time after movement of either switch to operative position; release means actuatable to place one of said switches into operative position; and control means for placing the other switch into operative position, at least for said predetermined time, in response to placing of said blade means into open position so that said time delay means can place said relay means into said one condition upon termination of actuation of said release means prior to elapse of said predetermined time.

2. A shutter assembly as defined in claim 1, wherein said driving means comprises a ring which is turnable between said first and second positions thereof.

3. A shutter assembly as defined in claim 1, wherein said control switches are connected in series with said delay means.

4. A shutter assembly as defined in claim 1, wherein said time delay means comprises at least one resistor.

5. A shutter assembly as defined in claim 1, wherein said closing means comprises a resilient element arranged to bias said driving means to second position.

6. A shutter assembly as defined in claim 1, further comprising a source of current which is connected in circuit with said relay means in response to movement of either control switch to operative position so that, in said one condition thereof, said relay means is energized.

7. A shutter assembly as defined in claim 1 wherein the operative positions are the closed positions of said switches.

8. A shutter assembly as defined in claim 1, further comprising cocking means for said driving means.

9. A shutter assembly as defined in claim 1, wherein said blade means comprises a plurality of blades.

10. In a camera, a shutter assembly comprising blade means movable between open and closed positions; driving means operatively connected with said blade means and movable between first and second positions respectively corresponding to open and closed positions of said blade means; closing means operative to bring about movement of said driving means to second position; relay means having two conditions of energization and arranged to operate said closing means in one of said conditions said closing means comprising a turnable member constituting the armature of said relay means; a pair of control switches each movable independently of the other to and from an operative position; a source of current connected in circuit with said relay means in response to movement of either control switch to operative position so that, in said one condition thereof, said relay means is energized; time delay means for placing said relay means into said one condition a predetermined time after movement of either switch to operative position; release means for placing one of said switches into operative position; and control means for placing the other switch into operative position, at least for said predetermined time, in response to placing of said blade means into open position.

References Cited

UNITED STATES PATENTS

| | | | |
|---|---|---|---|
| 2,577,774 | 12/1951 | Lee | 95—53 |
| 3,041,949 | 7/1962 | Buhrle | 95—63 X |
| 3,208,365 | 9/1965 | Cooper | 95—60 |

JOHN M. HORAN, Primary Examiner

UNITED STATES PATENT OFFICE
CERTIFICATE OF CORRECTION

Patent No. 3,513,761          Dated May 26, 1970

Inventor(s) Gerd Kiper

It is certified that error appears in the above-identified patent and that said Letters Patent are hereby corrected as shown below:

In the heading to the printed specification, after line 4, insert -- Assignor to Agfa Aktiengesellschaft, Leverkusen, Germany --.

Signed and sealed this 12th day of September 1972.

(SEAL)
Attest:

EDWARD M. FLETCHER, JR.
Attesting Officer

ROBERT GOTTSCHALK
Commissioner of Patents